United States Patent
Dye, Jr. et al.

(10) Patent No.: US 12,496,074 B2
(45) Date of Patent: Dec. 16, 2025

(54) INSTRUMENTS AND SYSTEMS INCLUDING A HUMERAL CUT GUIDE ASSEMBLY FOR AN ORTHOPEDIC SHOULDER REPLACEMENT

(71) Applicant: Zimmer, Inc., Warsaw, IN (US)

(72) Inventors: Donald W. Dye, Jr., Warsaw (IN); Michael A. Kay, Peru, IN (US); Michael Francis Kovacs, Winona Lake, IN (US)

(73) Assignee: Zimmer, Inc., Warsaw, IN (US)

(*) Notice: Subject to any disclaimer, the term of this patent is extended or adjusted under 35 U.S.C. 154(b) by 157 days.

(21) Appl. No.: 18/281,889

(22) PCT Filed: Mar. 16, 2022

(86) PCT No.: PCT/US2022/020589
§ 371 (c)(1),
(2) Date: Sep. 13, 2023

(87) PCT Pub. No.: WO2022/203921
PCT Pub. Date: Sep. 29, 2022

(65) Prior Publication Data
US 2024/0180567 A1    Jun. 6, 2024

Related U.S. Application Data

(60) Provisional application No. 63/165,963, filed on Mar. 25, 2021.

(51) Int. Cl.
*A61B 17/17* (2006.01)
*A61B 17/00* (2006.01)

(52) U.S. Cl.
CPC .............. *A61B 17/1778* (2016.11); *A61B 2017/00477* (2013.01); *A61B 2017/00876* (2013.01)

(58) Field of Classification Search
CPC ..... A61B 17/15; A61B 17/154; A61B 17/155; A61B 17/157; A61B 17/158;
(Continued)

(56) References Cited

U.S. PATENT DOCUMENTS

| 2002/0099381 A1 | 7/2002 | Maroney |
| 2006/0004373 A1* | 1/2006 | Ondrla ................... A61B 17/15 |
| | | 606/87 |

(Continued)

FOREIGN PATENT DOCUMENTS

| AU | 2022241973 | 12/2024 |
| EP | 4312820 B1 | 4/2025 |

(Continued)

OTHER PUBLICATIONS

"International Application Serial No. PCT/US2022/020589, International Search Report mailed Sep. 2, 2022", 7 pgs.

(Continued)

*Primary Examiner* — Samuel S Hanna
(74) *Attorney, Agent, or Firm* — SCHWEGMAN LUNDBERG & WOESSNER, P.A.

(57) ABSTRACT

An instrument assembly for an orthopedic procedure is disclosed. The instrument assembly can optionally include any one or combination of a reamer and a cut guide assembly. The cut guide assembly can be configured to couple to the reamer. The cut guide assembly can optionally include any one or combination of a clamp, a carriage and a cut block. The clamp can be selectively movable along a shaft of the reamer and lockable thereto. The first arm can project from the reamer. The carriage can be selectively moveable along a longitudinal length of the first arm. The cut block can be coupled to the carriage via one or more magnets.

9 Claims, 10 Drawing Sheets

(58) Field of Classification Search
CPC ..... A61B 17/152; A61B 17/151; A61B 17/17; A61B 17/1739; A61B 17/1742; A61B 17/1757; A61B 17/176; A61B 17/1764; A61B 17/1775; A61B 17/1778; A61B 17/1782
See application file for complete search history.

(56) References Cited

U.S. PATENT DOCUMENTS

| | | |
|---|---|---|
| 2009/0270866 A1 | 10/2009 | Poncet |
| 2010/0087829 A1 | 4/2010 | Metzger |
| 2012/0310246 A1 | 12/2012 | Belcher et al. |
| 2014/0276838 A1 | 9/2014 | Tsukayama et al. |
| 2017/0202566 A1 | 7/2017 | Luo et al. |

FOREIGN PATENT DOCUMENTS

| | | |
|---|---|---|
| JP | 2013521991 | 6/2013 |
| JP | 2024510801 | 3/2024 |
| WO | 2019143690 | 7/2019 |
| WO | WO-2022203921 A1 | 9/2022 |

OTHER PUBLICATIONS

"International Application Serial No. PCT/US2022/020589, Invitation to Pay Additional Fees mailed Jul. 12, 2022", 12 pgs.

"International Application Serial No. PCT/US2022/020589, Written Opinion mailed Sep. 2, 2022", 10 pgs.

"International Application Serial No. PCT US2022 020589, International Preliminary Report on Patentability mailed Oct. 5, 2023", 12 pgs.

"Australian Application Serial No. 2022241973, First Examination Report mailed May 16, 2024", 4 pgs.

"European Application Serial No. 22714705.5, Response Filed May 3, 2024 to Communication pursuant to Rules 161(1) and 162 EPC mailed Nov. 3, 2023", 8 pgs.

"Australian Application Serial No. 2022241973, Response filed Jul. 31, 2024 to First Examination Report mailed May 16, 2024", 10 pgs.

"Japanese Application Serial No. 2023-558548, Notification of Reasons for Refusal mailed Sep. 3, 2024", w English Translation, 11 pgs.

"Japanese Application Serial No. 2023-558548, Response filed Nov. 18, 2024 to Notification of Reasons for Refusal mailed Sep. 3, 2024", W English Claims, 10 pgs.

"Canadian Application Serial No. 3,213,398, Examiners Rule 86(2) Report mailed Jan. 2, 2025", 6 pgs.

"Japanese Application Serial No. 2023-558548, Final Notification of Reasons for Rejection mailed Mar. 11, 2025", W English Translation, 5 pgs.

"Japanese Application Serial No. 2023-558548, Response Filed May 22, 2025 to Final Notification of Reasons for Rejection mailed Mar. 11, 2025", W/ English Claims, 7 pgs.

\* cited by examiner

INSTRUMENTS AND SYSTEMS INCLUDING A HUMERAL CUT GUIDE ASSEMBLY FOR AN ORTHOPEDIC SHOULDER REPLACEMENT

CLAIM OF PRIORITY

This application is a U.S. National Stage Application under 35 U.S.C. 371 from International Application Serial No. PCT/US2022/020589, filed on Mar. 16, 2022, and published as WO 2022/203921 A1 on Sep. 29, 2022, which claims the benefit of U.S. Provisional Patent Application Ser. No. 63/165,963, filed on Mar. 25, 2021, the benefit of priority of each of which is claimed hereby, and each of which is incorporated by reference herein in its entirety.

BACKGROUND

The shoulder joint is a complex joint with the scapula, clavicle and the humerus all coming together to enable a wide range of movement, at least in a properly functioning joint. In a properly functioning shoulder joint the head of the humerus fits into a shallow socket in the scapula, typically referred to as the glenoid. Articulation of the shoulder joint involves movement of the humeral head in the glenoid, with the structure of the mating surfaces and surrounding tissues providing a wide range of motion.

The shoulder joint can undergo degenerative changes caused by various issues, such as rheumatoid arthritis, osteoarthritis, rotator cuff arthroplasty, vascular necrosis or bone fracture. When severe joint damage occurs and no other means of treatment is found to be effective, a total, partial, or reverse shoulder replacement or reconstruction may be necessary. Total shoulder replacements can involve a humeral prosthetic, including a stem and a head portion used to replace the natural humeral head. Total shoulder replacements will also typically involve resurfacing of the glenoid with a prosthetic implant. The glenoid implant generally will include an articulating cup shaped to receive the prosthetic humeral head. A reversal shoulder replacement (arthroplasty) involves a different set of humeral and glenoid replacement prosthetics. In a reverse shoulder the humeral component includes a cup shaped articular surface attached to a stem implanted into the humerus, while a spherical glenoid component is used to provide an articular surface for the humeral cup.

SUMMARY

Various techniques have been developed for resecting the humeral head to facilitate implantation of the humeral component. One such technique, utilizes an intramedullary rod or reamer to mount a cut block to facilitate resecting the humeral head. One problem to be solved by the present systems and instruments was known instrument assemblies utilized several knobs and thumbscrews. These knobs and thumbscrews can be cumbersome to loosen to manipulate the cut block to a different desired position. They also must then be retightened once the cut block is in the desired position. Additionally, previous systems and instruments constrained movement of the cut block to allow for movement only along one direction (generally along a boom arm). This can leave undesired gaps between the cut block face and a face of the humerus. However, the present instruments and systems can provide the surgeon with more flexibility in repositioning the cut block used in performing resection of the humerus. Rotational movement of the cut block can be achieved with the present instruments and systems. This provides the surgeon with improved ability to adjust the cut block to assist in resection of the humerus. Other instruments in the system are disclosed and provide the surgeon with other advantages such as improved efficiency through reduced complexity and reduced time to perform the procedure. For example, the present systems and instruments provide for pins that can be angled relative to one another and pins that can be placed at the resection surface. These configurations can facilitate better fixation of the cut block to the humerus reducing the likelihood the block would vibrate or shift positions in performing the guided resection.

Example 1 is an instrument assembly for an orthopedic procedure. The instrument assembly can optionally include any one or combination of a reamer and a cut guide assembly. The cut guide assembly can be configured to couple to the reamer. The cut guide assembly can optionally include any one or combination of a clamp, a carriage and a cut block. The clamp can be selectively movable along a shaft of the reamer and lockable thereto. The first arm can project from the reamer. The carriage can be selectively moveable along a longitudinal length of the first arm. The cut block can be coupled to the carriage via one or more magnets.

Example 2 is the instrument assembly of Example 1, wherein the clamp optionally includes a leaf spring configured to defect when selectively engaging the shaft of the reamer.

Example 3 is the instrument assembly of any one or any combination of Examples 1-2, wherein the clamp optionally includes a plunger configured to engage the shaft of the reamer and a lever configured to actuate movement the plunger to engage with and disengage from the shaft of the reamer.

Example 4 is the instrument assembly of Example 3, wherein the plunger optionally is positioned within and moveable relative to the first arm, and wherein optionally the lever is positioned at a longitudinal end portion of the first arm opposing the reamer.

Example 5 is the instrument assembly of any one or any combination of Examples 1-4, wherein the carriage optionally includes a spring finger configured to engage with the first arm.

Example 6 is the instrument assembly of any one or any combination of Examples 1-5, wherein the carriage optionally includes a second arm projecting away from the first arm and a retainer configured to receive the one or more magnets therein.

Example 7 is the instrument assembly of Example 6, wherein the one or more optionally comprise button magnets.

Example 8 is the instrument assembly of any one or combination of Examples 6-7, optionally further comprising one or more inverted cups configured to receive the one or more magnets therein.

Example 9 is the instrument assembly of Example 8, optionally further comprising one or more wave springs configured to bias the one or more magnets against a lid of the one or more inverted cups.

Example 10 is the instrument assembly of any one or combination of Examples 6-9, wherein the retainer optionally has a plurality rails and grooves configured to engage with a corresponding plurality of rails and grooves of the cut block.

Example 11 is the instrument assembly of any one or any combination of Examples 1-10, wherein the cut block optionally is configured to be rotatable relative to the carriage.

Example 12 is the instrument assembly of any one or combination of Examples 1-11, optionally further comprising a plurality of rods configured to indicate an orientation of the cut guide assembly.

Example 13 is an instrument system for an orthopedic procedure. The instrument system can optionally include any one or combination of a reamer and a cut guide assembly. The cut guide assembly can optionally be configured to couple to the reamer. The cut guide assembly can optionally include any one or combination of a first arm, a clamp, a carriage and a cut block. The clamp can be configured to be movable along a shaft of the reamer. The clamp optionally includes a leaf spring configured to be positioned within the firm arm and configured to deflect when selectively engaged with the shaft of the reamer to lock the clamp to the shaft. The carriage can be configured to be movable along the arm. The cut block can be configured to couple with the carriage.

Example 14 is the instrument system of Example 13, optionally further comprising one or more magnets configured to couple the cut block to the carriage.

Example 15 is the instrument system of any one or combination of Examples 13-14, wherein the carriage optionally has a plurality rails and grooves configured to engage with a corresponding plurality of rails and grooves of the cut block.

Example 16 is the instrument system of any one or combination of Examples 13-15, wherein the cut block optionally is configured to be rotatable relative to the carriage.

Example 17 is the instrument system of any one or combination of Examples 13-16, optionally further comprising one or more inverted cups configured to receive one or more magnets therein and one or more wave springs configured to bias the one or more magnets against a lid of the one or more inverted cups.

Example 18 is a method of resecting a head of a humerus. The method can optionally include any one or combination of inserting a reamer in the humerus, adjusting a proximal-distal position of the cut block assembly relative to the reamer and humerus, clamping the cut block assembly to the reamer once a desired proximal-distal position of a cut block is achieved relative to the humerus, adjusting an anterior-posterior position of the cut block, and adjusting a rotational position of the cut block.

Example 19 is the method of Example 18, optionally further comprising mounting the cut block to the cut block assembly via one or more magnets.

Example 20 is the method of any one or combination of Examples 18-19, wherein clamping the cut block assembly to the reamer optionally includes engaging a leaf spring with the reamer and deflecting the leaf spring laterally relative to the reamer.

Each of these non-limiting examples can stand on its own, or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As discussed herein, orthopedic systems and apparatuses are disclosed herein that facilitate resection and/or sizing of tissue. It should be noted that although described in reference to a humerus, the apparatuses and systems of the present application are applicable to other bones or bone portions including the femur or tibia, for example.

Figure 1:
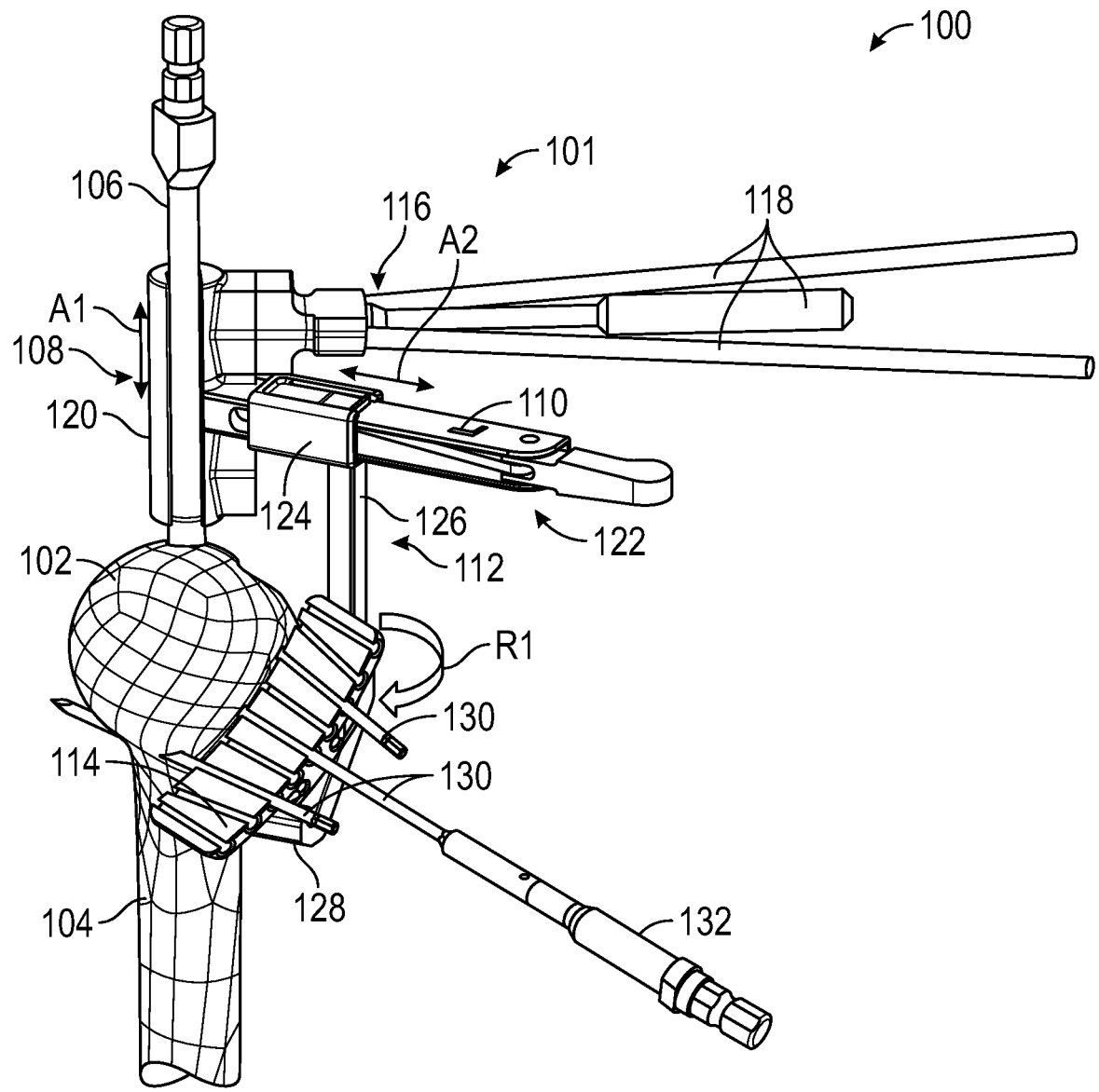
FIG. 1 is a perspective view a system including a cut block assembly and a reamer with the cut guide assembly mounted to a humerus via the reamer, according to an example of the present application.

FIG. 1 shows a system 100 that includes cut guide assembly 101 according to one example. The cut guide assembly 101 can used to resect a head 102 of a humerus 104 as further discussed an illustrated herein. The system 100 can further include a reamer 106 and other components as further discussed herein. The cut guide assembly 101 can be mounted in position relative to the humerus 104 via the reamer 106. The cut guide assembly 101 can include various components including a clamp 108, a first arm 110, a carriage 112, a cut block 114 and indicia 116.

As shown in FIG. 1, the reamer 106 can be inserted into the humerus 104 along a longitudinally extending intramedullary recess thereof. The clamp 108 can be configured to couple the remainder of the cut guide assembly 101 to the reamer 106. The first arm 110 can couple to one or more parts of the clamp 108. The first arm 110 can project away from the reamer 106 in a cantilevered manner. The carriage 112 can couple with the first arm 110. The carriage 112 can be selectively moveable along a longitudinal length of the first arm 110. The carriage 112 can include a portion thereof that extends away from the first arm 110 generally distally and posteriorly toward the head 102 of the humerus 104. The cut block 114 can be coupled to the carriage 112 at an end thereof that opposes an end that is coupled to the first arm 110. As discussed further herein, the cut block 114 can be selectively rotatable relative to the carriage 112. Such configuration for the cut block 114 can be facilitated by one or more magnets and/or other mechanisms as further discussed herein. The indicia 116 can include one or more rods 118 that can be mounted to indicate varus orientation of the cut guide assembly 101. One of the one or more rods 118 can be angled to be aligned with the lower forearm of the patient, for example.

The clamp 108 can be selectively movable along a shaft of the reamer 106 and can be lockable thereto. As shown in FIG. 1, the clamp 108 can include a shaft clamp 120 and locking mechanism 122. The shaft clamp 120 can comprise a sleeve or C-clamp type device configured to receive portions of the reamer 106. The shaft clamp 120 can be sized to be moveable along the shaft of the reamer 106. The locking mechanism 122 can extend through the shaft clamp 120 to selectively engage the reamer 106 as further discussed and illustrated herein. The clamp 108, via the locking mechanism 122 can connect the clamp 108 and a remainder of the cut guide assembly 101 to the reamer 106 when a desired position is achieved.

The shaft clamp 120 can be connected to the first arm 110. According to some examples, such connect can be an integral connect or via a weld connection. However, another type of connection, such as a keyway, fastener, etc. is contemplated. According to some examples, the first arm 110 can have an open frame design and can be configured to receive portions of the locking mechanism 122 therein as further discussed subsequently. The first arm 110 can extend radially outwards from the reamer 106 to an open end.

The carriage 112 moveable relative to the first arm 110 along a longitudinal length thereof. The carriage 112 can include a bracket 124, a second arm 126 and a retainer 128. The bracket 124 can comprise an open ended feature configured to receive the first arm 110. The bracket 124 can include a connection feature configured to lock a position of the carriage 112 relative to the first arm 110 as further discussed herein. The second arm 126 can couple with the bracket 124 and can extend outwards therefrom and from the first arm 110. The second arm 126 can be configured to generally distally in a spaced manner generally parallel with a longitudinal length of the reamer 106. The second arm 126 can couple with the retainer 128. The retainer 128 can be selectively positioned by the clamp 108 and the carriage 112 so as to be positioned generally outwards (anterior) of the head 102 of the humerus 104 as shown in FIG. 1.

The retainer 128 can be configured to capture the cut block 114 therein to mount the cut block 114. However, the retainer 128 can be configured to capture the cut block 114 in a moveable manner. For example, the cut block 114 can be rotatable relative to the retainer 128 and other parts of the carriage 112 as further discussed herein.

As shown in FIG. 1, the system 100 can include a plurality of pins 130 or other features such as bone screws, etc. These can be configured to be driven or otherwise inserted into the head 102 of the humerus 104 by a driver 132 or other instrument. The plurality of pins 130 can be directed by slots or apertures in the cut block 114 as illustrated.

As a result of the components and features described herein, the cut guide assembly 101 can be selectively movable along the reamer as shown by arrow A1. The carriage 112 and remainder of the cut guide assembly 101 can be moveable along the first arm 110 as shown by arrow A2. The cut block 114 can be rotatable and moveable relative to the carriage 112 and humerus 104 as shown by arrow R1. More particularly, the cut block 114 can be moveable in a constrained manner toward and away from the head 102 as guided by the retainer 128 as further discussed herein. Additionally, the cut block 114 can be rotatable relative to the retainer 128.

Figure 2:
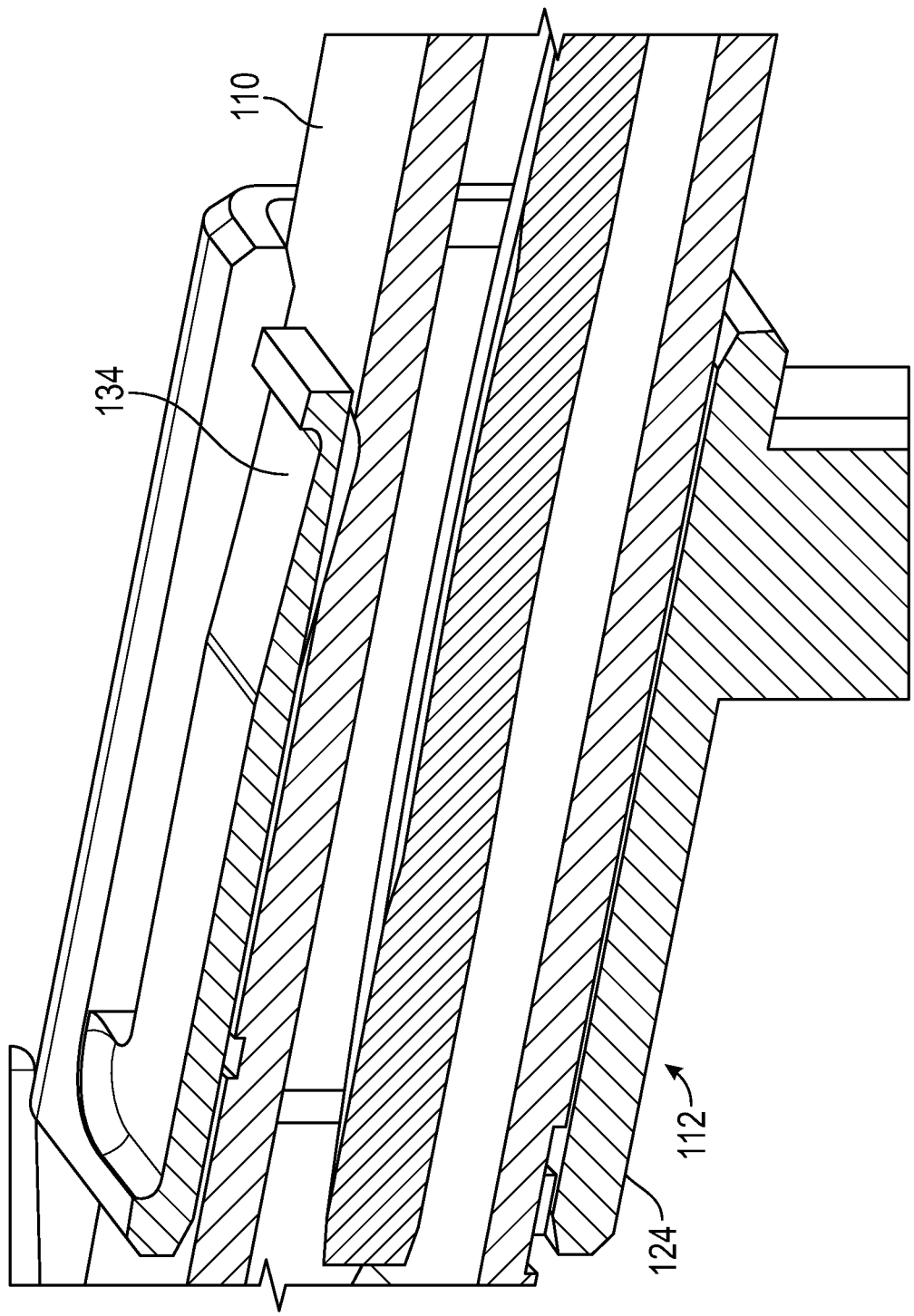
FIG. 2 is an enlarged cross-sectional view of a portion of a carriage and arm of the cut guide assembly of FIG. 1 according to an example of the present application.

FIG. 2 shows an enlarged cross-sectional view of portions of the first arm 110 and the carriage 112. FIG. 2 shows the bracket 124 can included a spring finger 134. The spring finger 134 can be biased or otherwise configured to interfere with or otherwise engage the first arm 110. This allows constant friction to be applied to the first arm 110. This arrangement can improve vibration resistance of the carriage 112. The spring finger 134 can engage with an outer surface of the arm 110. Using the spring finger 134, the carriage 112 can be locked or otherwise coupled to the first arm 110. This can maintain relative positioning between the two components. The carriage 112 can be moved relative to the first arm 110 by disengaging the spring finger 134 from engagement with the first arm 110. This can allow the bracket 124 to be slide or otherwise moved along a longitudinal length or the first arm 110.

Figure 3:
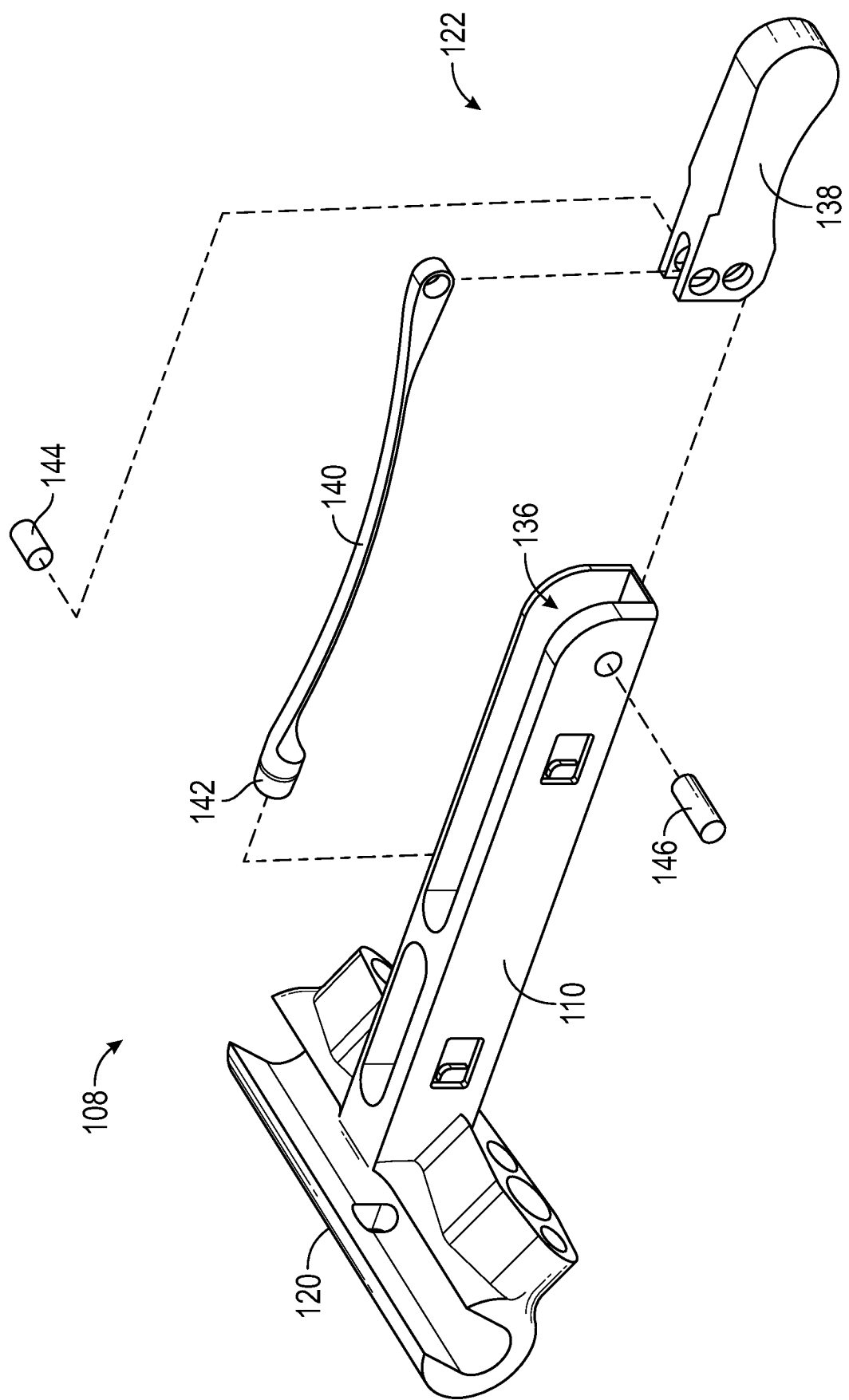
FIG. 3 is an exploded view of the arm and a clamp of the cut guide assembly of FIG. 1 according to an example of the present application.

FIG. 3 shows a perspective view of the clamp 108 and first arm 110 with some components of the clamp 108, in particular, the locking mechanism 122 exploded. As previously discussed and illustrated, the clamp 108 can include the shaft clamp 120 configured to receive the reamer. FIG. 3 shows the first arm 110 can have an open frame design with a cavity 136 formed by walls of the frame.

The locking mechanism 122 can include a lever 138, a leaf spring 140 and a plunger 142. The lever 138 can couple to the leaf spring 140 at a first end thereof by a pin 144 or other known feature or fastener such as a bolt, etc. The lever 138 can also be pivotally movable relative to the first arm 110 and can be pivotally coupled thereto such as via a second pin 146. The lever 138 can be configured as a handle to be graspable. The lever 138 can be configured to actuate the leaf spring 140 and the plunger 142 as further described. According to some examples, the lever 138 can be configured as a camming mechanism to bring the plunger 142 into engagement with the reamer 106 (FIG. 1).

As shown in FIG. 3, the leaf spring 140 can be an elongate rod or member with a relatively thinner lateral thickness as compared with a longitudinal length. The leaf spring 140 can be configured to be received in the 136 of the first arm 110. The leaf spring 140 can be slightly bowed along the longitudinal length thereof. Bowing of the leaf spring 140 can increase with engagement of the plunger 142 against the reamer as further illustrated herein.

Figure 4:
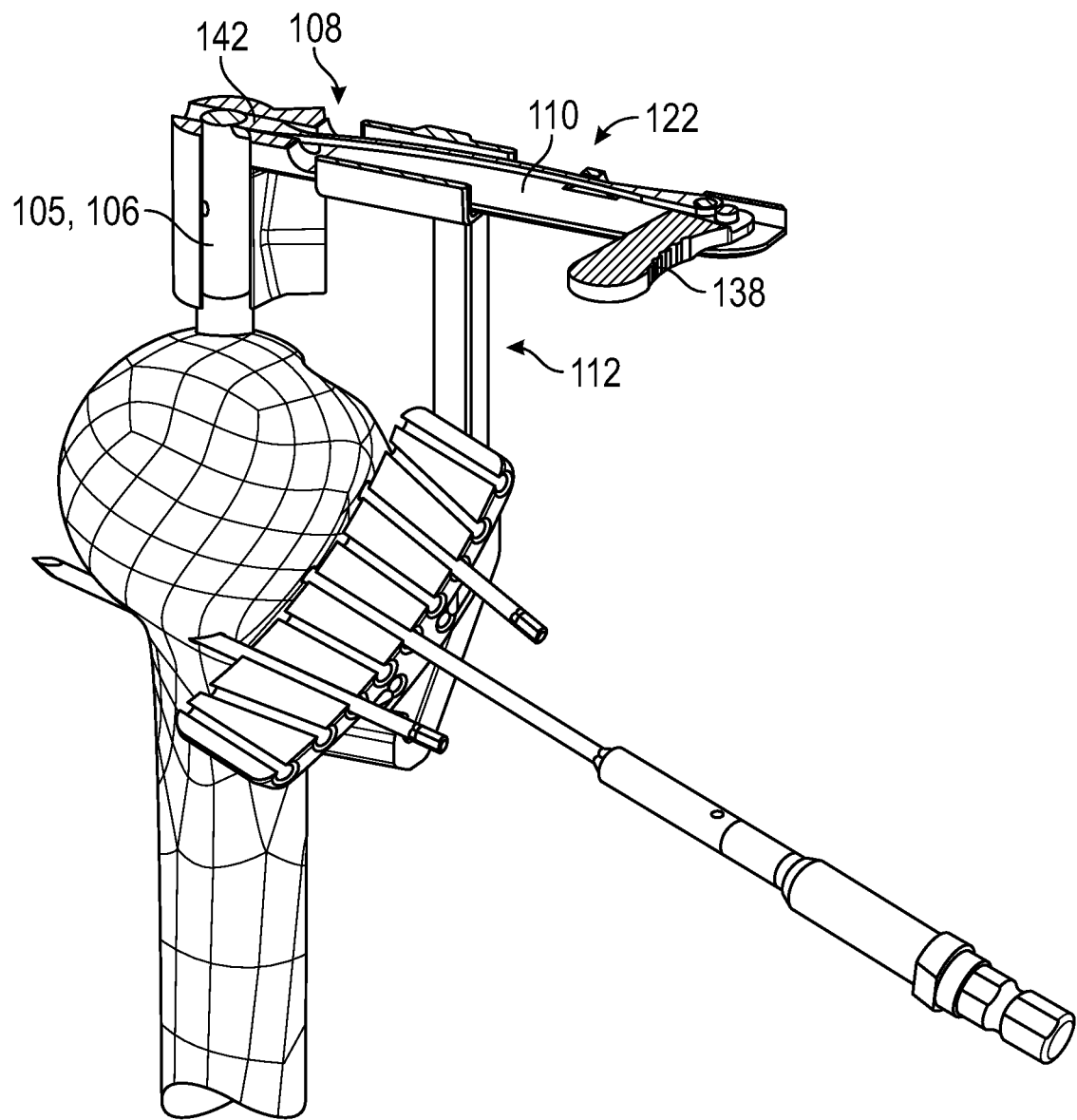
FIG. 4 is schematic partial cross-sectional view of portions of the cut guide assembly of FIG. 1 including the clamp, arm and carriage and further illustrating aspects of the cut block according to an example of the present application.

The plunger 142 can connect with the leaf spring 140 at a second end thereof. This second end can oppose the first end that is connected to the lever 138. The plunger 142 can be configured to selectively engage the reamer as further illustrated herein. Engagement of the reamer by the plunger 142 can lock a position of the clamp 108 and the arm 110 relative to the reamer as previously discussed. FIGS. 4-5B show operation of the clamp 108, in particular, the locking mechanism 122. In FIGS. 4-5B, portions of the first arm 110 and carriage 112 are removed to better illustrate operation of the locking mechanism 122. FIGS. 4 and 5B show the locking mechanism 122 in the locked position with the lever 138 rotated to bring the plunger 142 into engagement with a shaft 105 of the reamer 106. FIG. SA shows the locking mechanism 122 in an unlocked position with the lever 138 rotated to bring the plunger 142 out of engagement with the shaft 105 of the reamer 106.

Figure 5A:
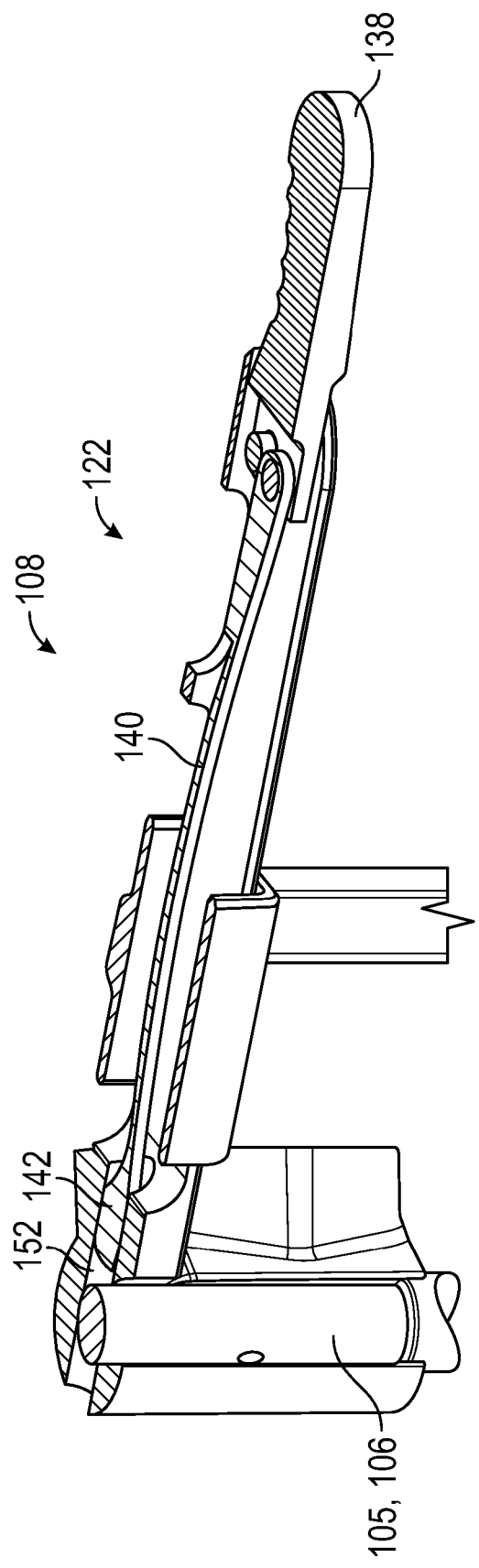
FIG. 5A is partial cross-sectional view of the arm showing the clamp in an unlocked position allowing for movement of the arm and clamp relative to the reamer according to an example of the present application.
Figure 5B:
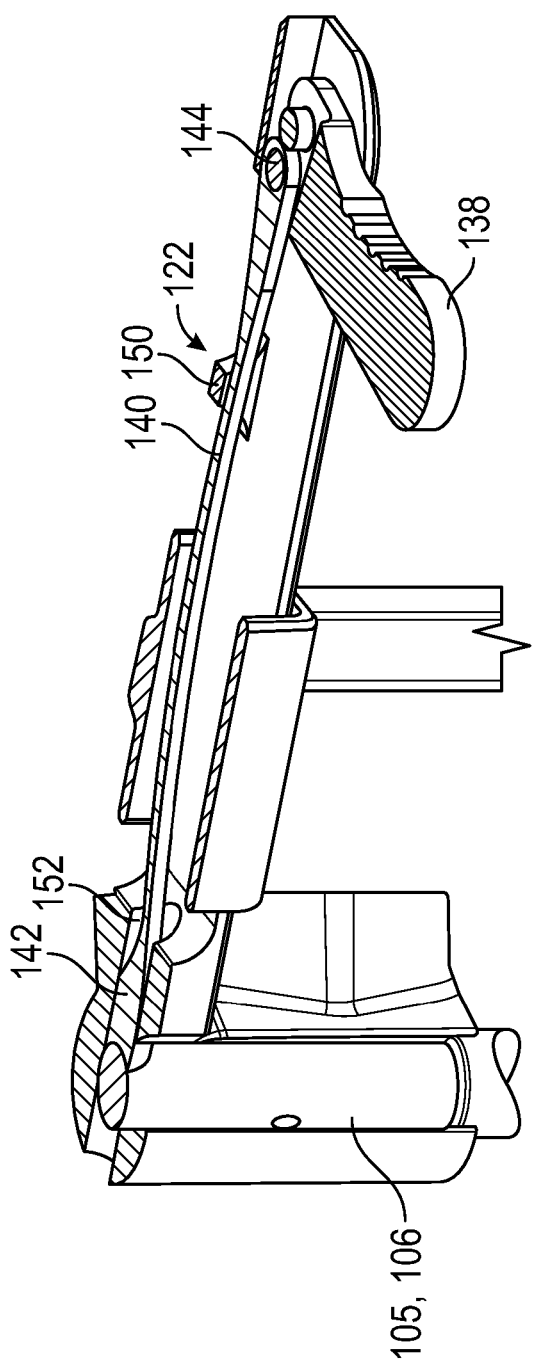
FIG. 5B is a partial cross-sectional view of the arm showing the clamp in an locked position engaging the reamer according to an example of the present application.

In FIG. 5A, with the lever 138 in the unlocked position, the plunger 142 is positioned via the leaf spring 140 so as to be spaced from the shaft 105 of the reamer 106. In FIG. 5B, the lever 138 is rotated to the locked position, this moves the plunger 142 into engagement with the shaft 105 of the reamer 106.

Additionally, as shown in FIG. 5B, in the locked position, the leaf spring 140 can bow or otherwise deflect laterally outward relative to a longitudinal length as compared with the unlocked position. The configuration of the leaf spring 140 can provide for a more smooth or iterative application of force on the reamer 106 and reduced and/or smoother application of actuation force to rotate the lever 138. The configuration of the clamp 108, particularly using the leaf spring 140 facilitates vibration-resistant connection with the shaft 105 of the reamer 106. The clamp 106 is configured to resist shaking loose or changing tension on the reamer 106 when the cut guide assembly is subjected to an oscillating saw blade.

The pin 144 can affix the leaf spring 140 to the lever 138 at a first end thereof. The first arm 110 and/or carriage 112 can be provided with a stop 150 to retain and/or halt lateral deflection of the leaf spring 140. The shaft clamp 120 can have a passage 152 therein. The passage 152 can be configured to receive and retain the plunger 142 (i.e. the second end of the leaf spring 140) even during deflection of the middle portion of the leaf spring 140 as shown in FIG. 5B. The passage 152 can extend through the shaft clamp 120 allowing the plunger 142 to selectively engage with the shaft 105 of the reamer 106.

Figure 6A:
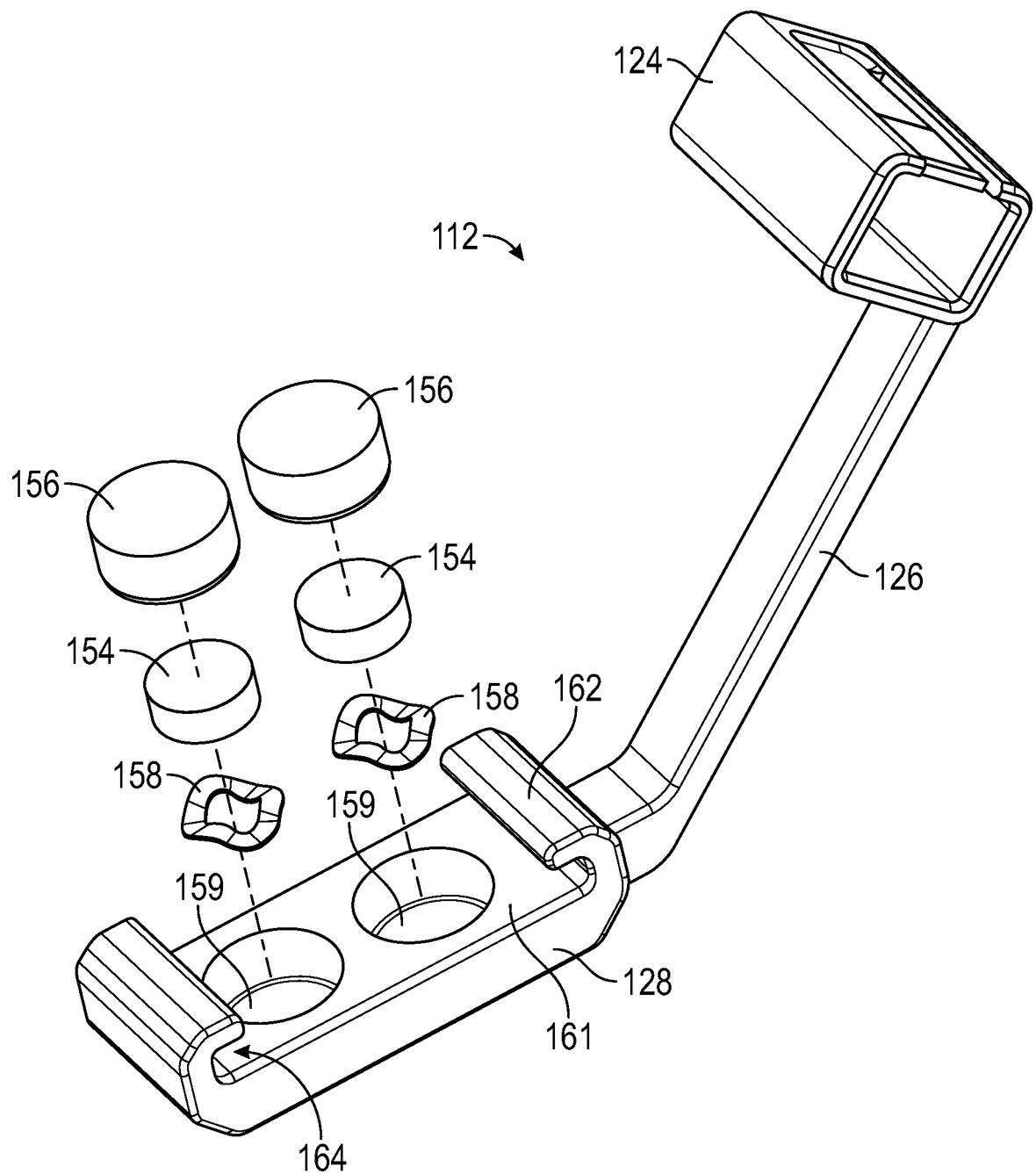
FIG. 6A is a perspective view of the carriage showing an exploded view of one or more magnets and other components housed therein according to an example of the present application.
Figure 6B:
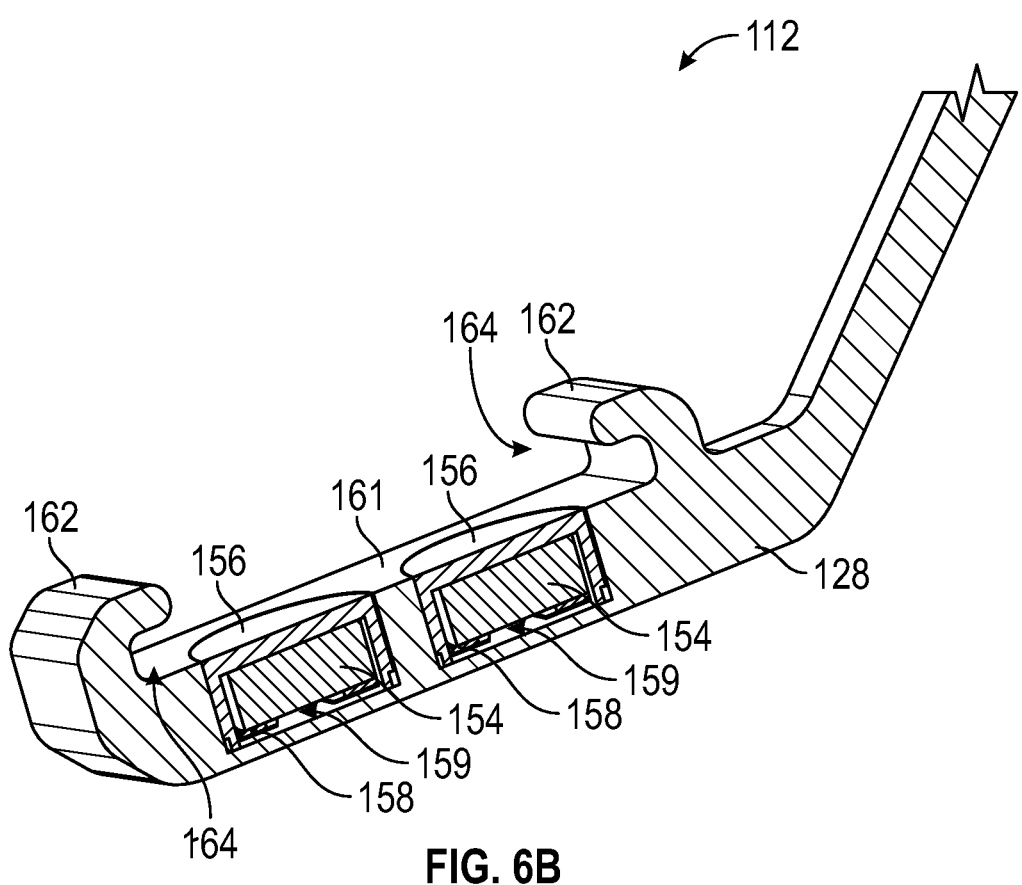
FIG. 6B is a partial cross-sectional view of a part of the carriage that houses the one or more magnets according to an example of the present application.

FIGS. 6A and 6B show the carriage 112 in further detail. An interface between the carriage 112 and the cut block 114 can comprise a pair of interfaces designed for coupling the two components together. One interface can be mechanical and one can be magnetic. The mechanical interface can be between opposing undercuts (rails) in the bottom portion of the carriage 112 and a pair of closely-fitted lips on the cut block 114 (as shown in FIG. 7B). These features can accurately locate the cut block 114 at the correct angle as set by the carriage 112. Basically, these interfaces can set the resection plane as defined by atop of the cut block 114. However, these features can allow the cut block 114 to be free to rotate and/or to slide (or otherwise move) back and forth in the plane. However, the cut block 114 can be constrained to motion only in this plane as dictated by the orientation of the carriage 112 and the rails (see discussion below). The magnetic interface can hold the cut block 114 against the mating surface of the carriage 112, with the force being defined by the magnetic field strength of the magnet(s) embedded into the carriage 112.

FIG. 6A shows components previously discussed including the bracket 124, the second arm 126 and the retainer 128. FIGS. 6A and 6B additionally illustrate further components and features of the retainer 128. Thus, FIGS. 6A and 6B show one or more magnets 154, one or more inverted cups 156 and one or more wave springs 158. The retainer 128 can include one or more recesses 159, one or more rails 162 and one or more grooves 164.

As shown in FIG. 6B, the retainer 128 can have the one or more recesses 159 configured to receive the one or more magnets 154, one or more inverted cups 156 and one or more wave springs 158. The one or more recesses 159 can be configured to position the assembly of the one or more magnets 154, one or more inverted cups 156 and one or more wave springs 158 below or flush with a surface 161 of the retainer 128.

The one or more inverted cups 156 can be configured to receive the one or more magnets 154 therein. The one or more inverted cups 156 can be welded or otherwise affixed to an interior of the one or more recesses 159. The wave springs 158 can be seated in a bottom of the recesses 159 and can be configured to bias the one or more magnets 154 against an interior lid of the one or more inverted cups 156 as shown in FIG. 6B.

The retainer 128 can be shaped as a track having open opposing ends. The one or more rails 162 and the one or more grooves 164 can be positioned laterally relative to these openings. The one or more grooves 164 can be positioned distal of the one or more rails 162 adjacent the surface 166. The one or more rails 162 can be shaped as hooks to couple with mating female features of the cut block. Similarly, the one or more grooves 164 can be shaped to receive and mate with male features of the cut block. It should be noted that the one or more grooves 164 and the one or more rails 162, and indeed the shape of the retainer 128 can allow for generally anterior-posterior adjustment of the cut block. Furthermore, the one or more magnets 154, the one or more grooves 164 and the one or more rails 162 can be configured to allow rotational adjustment of the cut block as previously discussed and illustrated relative to FIG. 1.

Figure 7:
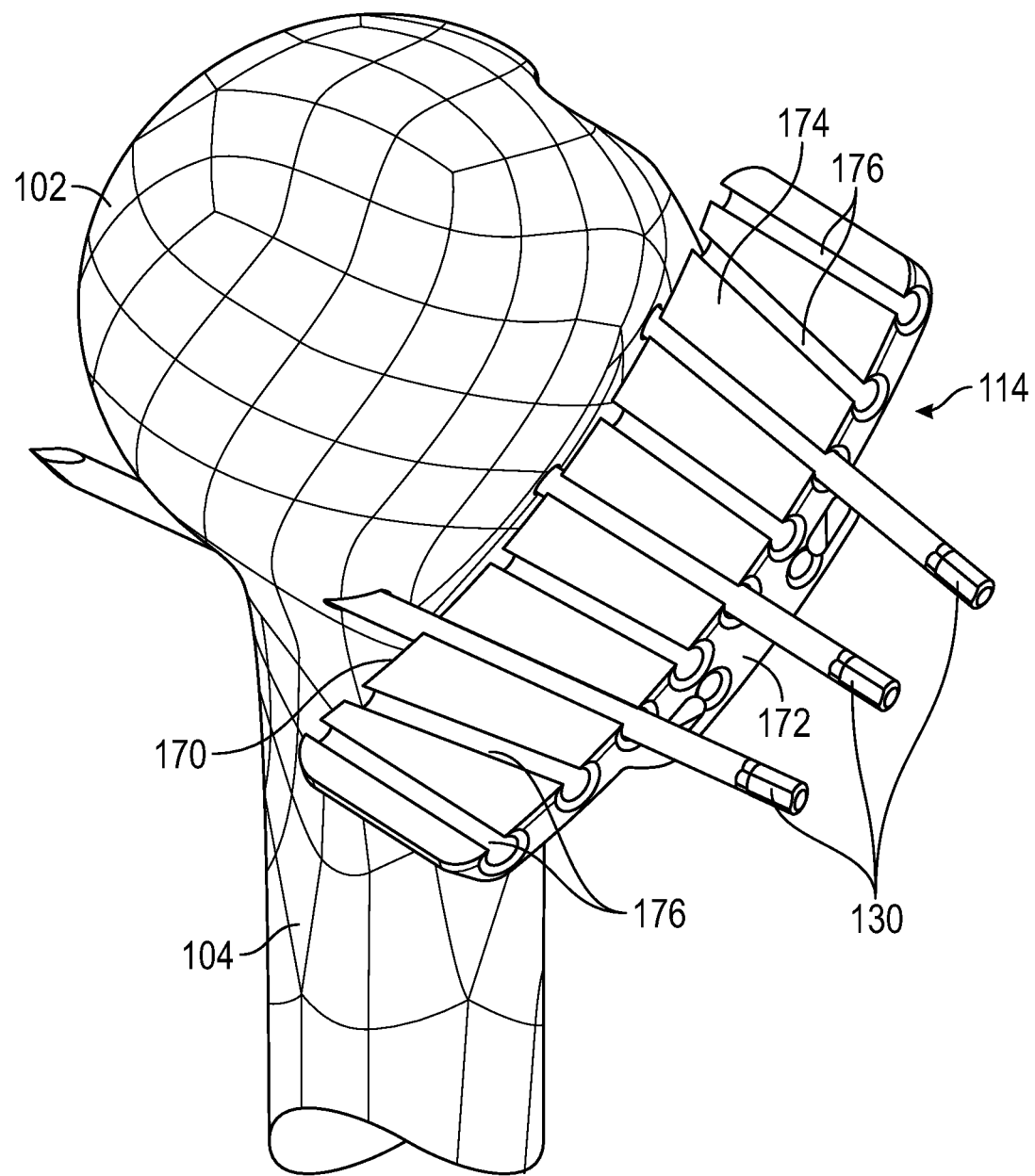
FIG. 7 is a perspective view of the cut block coupled to the humerus by one or more pins according to an example of the present application.
Figure 7A:
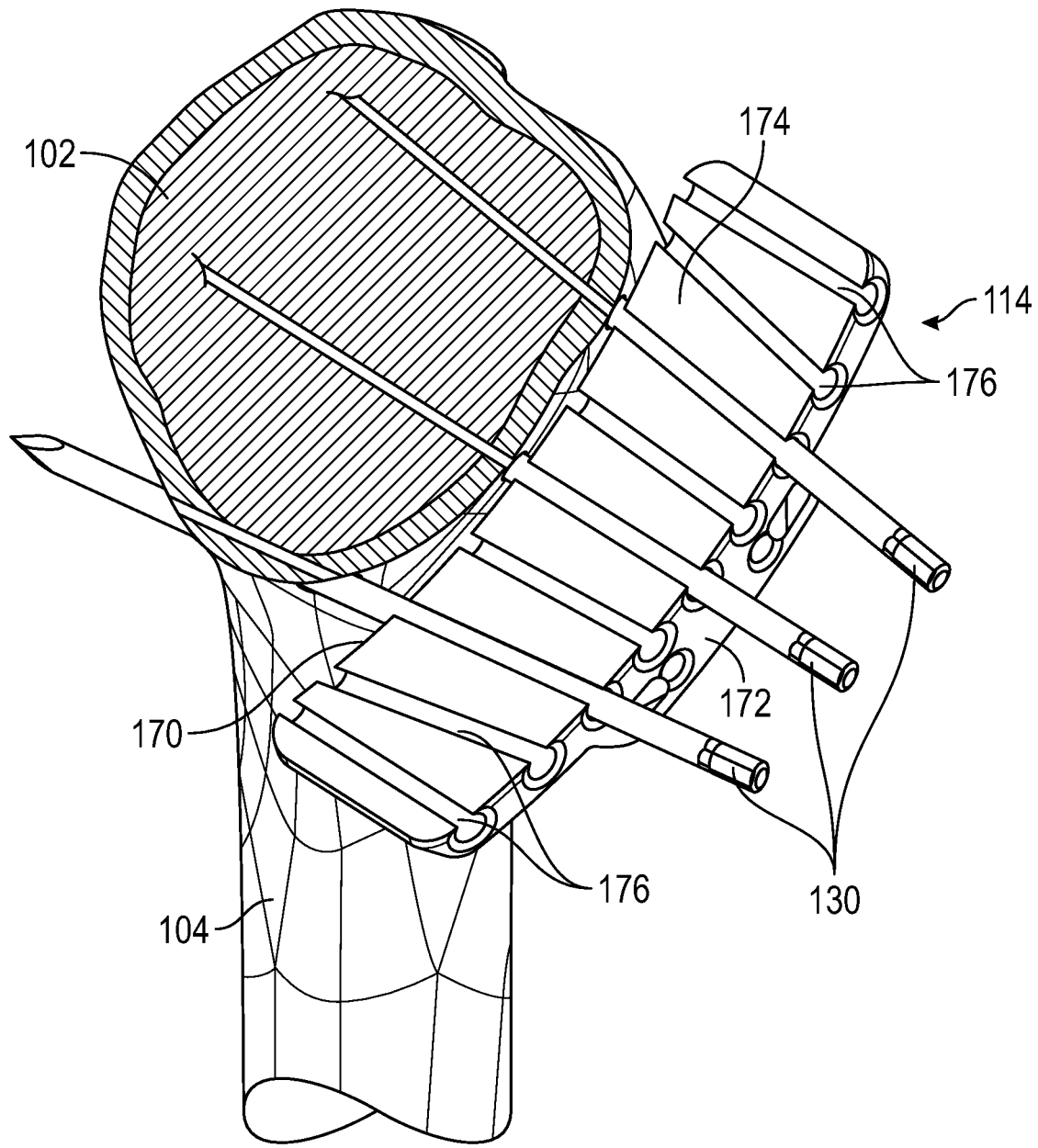
FIG. 7A is a perspective view of the cut block being used to perform a resection of the femur according to an example of the present application.
Figure 7B:
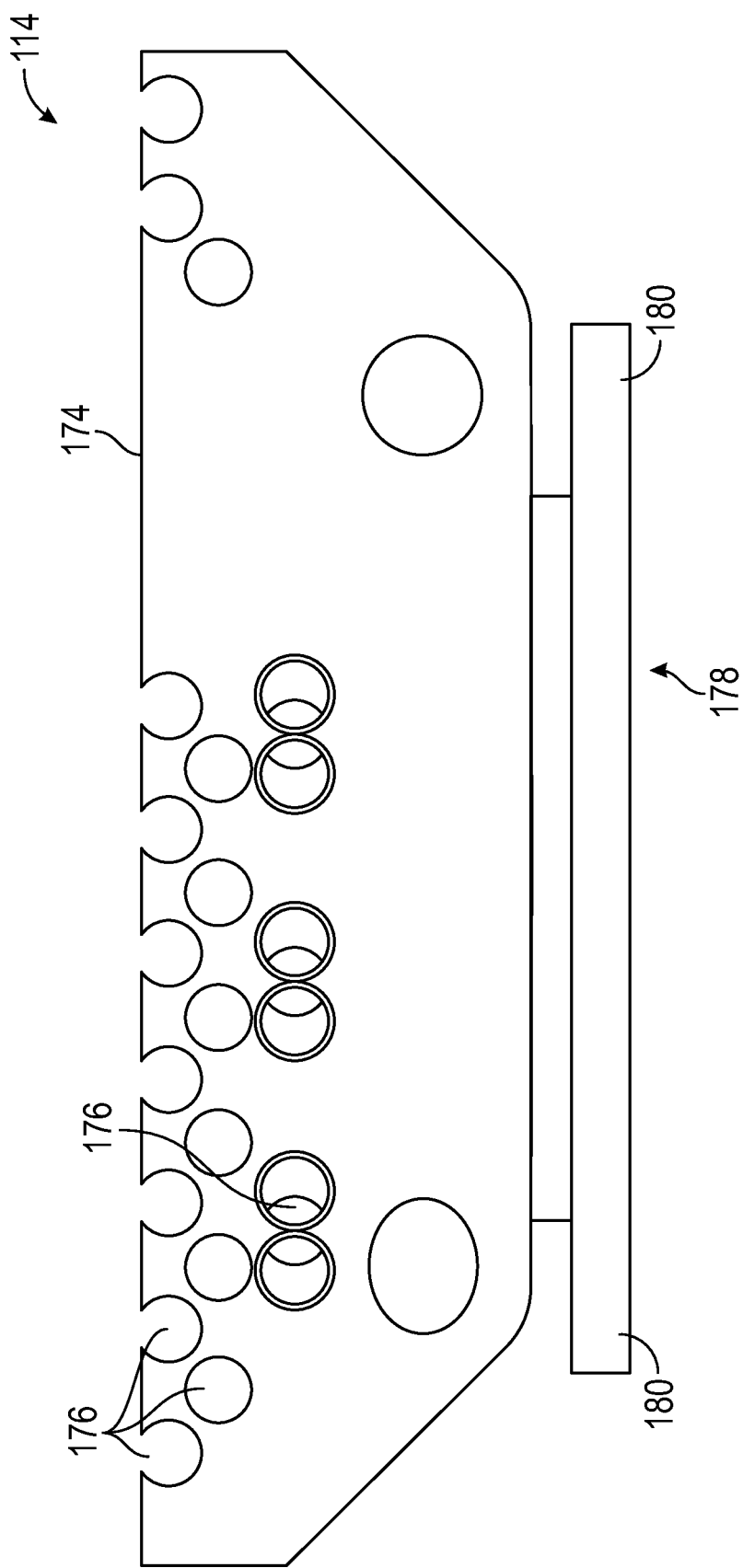
FIG. 7B is a plan view of the cut block according to an example of the present application.

FIGS. 7-7B show the cut block 114 in further detail. The cut block 114 can be oriented by the remainder of the cut guide assembly to be adjacent (including slightly spaced or abutting the head 102) of the humerus 104. In particular, the cut block 114 can be oriented anterior of the head 102 and can be distal of a portion of the head 102. Although the cut block 114 is shown as oriented diagonal extending proximal-distal and medial-lateral in FIGS. 7 and 7A various other orientations for the cut block 114 are contemplated. As discussed previously, the cut block 114 can be rotatable relative to the humerus 104, the reamer 106 and other portions of the cut guide assembly 101 as previously discussed and illustrated. It should be noted that according to some examples, once the cut block 114 is pinned as shown in FIGS. 7-7B, the remainder of the cut guide assembly 101 can be removed.

The cut block 114 can include one or more portions thereof or can be entirely constructed of ferrous material. Alternatively, the cut block 114 can include one or more magnets configured to be attracted to the one or more magnets of the carriage. As shown in FIGS. 7-7B, the cut block 114 can be shaped to be 360 degrees rotationally adjustable. Thus, in some implementations a bone interfacing side 170 of the cut block 114 as shown in FIGS. 7 and 7A can be 180 degrees rotated in orientation so as to be reversed to be a bone opposing side. In such case, an opposing side 172 of the cut block 114 would become the bone interfacing side. The cut block 114 can also be configured for use on either a left humerus or a right humerus.

As shown in FIGS. 7-7B, the cut block 114 can include a proximal or resection surface 174 and a plurality of apertures 176. The plurality of apertures 176 can be configured to receive pins 130 or other features as shown in FIGS. 7 and 7A. Some of the plurality of apertures 176 can have openings to the proximal or resection surface 174 that can allow portions of affixing pins to be exposed at the proximal or resection surface 174. These exposed pins can aid in guiding resection of the humeral head 102 as shown in FIG. 7A. More particularly, a top tangent surfaces of all the pins along with the proximal or resection surface 174 can form one continuous, step-free, plane for the saw blade to traverse while the cut is being made.

As shown in FIG. 7B, a number of the plurality of apertures 176 can also be recessed a desired distance from the resection or proximal surface 174. Various different aperture orientations including intersecting or non-aligned orientations for the apertures relative to one another are contemplated. These splayed apart apertures (rather than being parallel) can works to retain the cut block 114 against the humerus against oscillating saw blade vibrations. FIG. 7B additionally shows a base 178 having mating features such as lips 180 for the one or more grooves 164 and the one or more rails 162 of the retainer 128 (FIGS. 6A and 6B) to facilitate coupling therewith.

The clamp 108 can eliminate the need for threaded thumbscrews or other mechanisms typically used with prior cut guide assemblies. Once the cut block 114 is in place and pinned, the clamp 108 can be loosened in a single motion. This can allow the remainder of the cut guide assembly 101 save the cut block to be removed without having to loosen or disengage other components as with the prior cut guide assemblies. The spring finger 134 can eliminate the need for another thumbscrew or other mechanism typically used with prior cut guide assemblies. The one or more magnets along with the configuration of the one or more grooves 164 and the one or more rails 162 of the retainer 128 can eliminate the need for yet another thumbscrew or other mechanism typically used with prior cut guide assemblies. Fitment between the one or more rails 162 of the retainer 128 and the cut block 114 allows the cut block 114 to be slid up adjacent to the humerus to give the minimum possible gap between the cut block 114 and the head 102. Some of the plurality of apertures 176 with an opening to the resection or proximal surface 174 of the cut block 114 make the tops of the affixing pins an extension of the cut block 114 into the bone itself, which further improves resection flatness and accuracy. These open to the resection or proximal surface 174 plurality of apertures 176 also can serve as a "flatness gauge" for the cut, by allowing the surgeon to view any areas of the resection that the pin sides are not visible to be re-cut or the resection "polished" with the saw blade until the resection is flat. The indicia 116 including rods, which can be attached quickly and efficiently to every instrument in the system 100 that requires reference to the patient's forearm to set or check retroversion. These parts are versatile in that they can be used together for a 20/30/40 degree combination retroversion setup for either Left or Right hand surgeries, or the center 30 degree Rod can be used alone if desired.

Various Notes

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more Examples thereof), either with respect to a particular example (or one or more Examples thereof), or with respect to other examples (or one or more Examples thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "substantially round," a component that is not precisely circular (e.g., one that is slightly oblong or is a many-sided polygon) is still encompassed by this description.

The above description is intended to be illustrative, and not restrictive. For example, the above-described examples (or one or more Examples thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An instrument assembly for an orthopedic procedure, comprising:
   a reamer; and
   a cut guide assembly configured to couple to the reamer, the cut guide assembly comprising:
      a clamp selectively movable along a shaft of the reamer and lockable thereto;

a first arm projecting from the reamer;

a carriage selectively moveable along a longitudinal length of the first arm; and a cut block coupled to the carriage via one or more magnets;

wherein the carriage includes a second arm projecting away from the first arm and a retainer configured to receive the one or more magnets therein;

the retainer comprising:

one or more inverted cups configured to receive the one or more magnets therein; and one or more wave springs configured to bias the one or more magnets against a lid of the one or more inverted cups.

2. The instrument assembly of claim 1, wherein the clamp includes a leaf spring configured to defect when selectively engaging the shaft of the reamer.

3. The instrument assembly of claim 1, wherein the clamp includes a plunger configured to engage the shaft of the reamer and a lever configured to actuate movement the plunger to engage with and disengage from the shaft of the reamer.

4. The instrument assembly of claim 3, wherein the plunger is positioned within and moveable relative to the first arm, and wherein the lever is positioned at a longitudinal end portion of the first arm opposing the reamer.

5. The instrument assembly of claim 1, wherein the carriage includes a spring finger configured to engage with the first arm.

6. The instrument assembly of claim 1, wherein the one or more magnets comprise button magnets.

7. The instrument assembly of claim 1, wherein the retainer has a plurality rails and grooves configured to engage with a corresponding plurality of rails and grooves of the cut block.

8. The instrument assembly of claim 1, wherein the cut block is configured to be rotatable relative to the carriage.

9. The instrument assembly of claim 1, further comprising a plurality of rods configured to indicate an orientation of the cut guide assembly.

* * * * *